United States Patent
Shi et al.

(10) Patent No.: US 12,225,578 B2
(45) Date of Patent: Feb. 11, 2025

(54) METHOD FOR TRANSMITTING INFORMATION IN RANDOM ACCESS PROCESS, TERMINAL DEVICE AND NETWORK DEVICE

(71) Applicant: GUANGDONG OPPO MOBILE TELECOMMUNICATIONS CORP., LTD., Guangdong (CN)

(72) Inventors: Cong Shi, Guangdong (CN); Zuomin Wu, Guangdong (CN); Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 576 days.

(21) Appl. No.: 17/501,648

(22) Filed: Oct. 14, 2021

(65) Prior Publication Data
US 2022/0039152 A1 Feb. 3, 2022

Related U.S. Application Data

(63) Continuation of application No. PCT/CN2019/084652, filed on Apr. 26, 2019.

(51) Int. Cl.
 *H04W 74/00* (2009.01)
 *H04W 74/08* (2024.01)
 *H04W 74/0816* (2024.01)

(52) U.S. Cl.
 CPC ..... *H04W 74/006* (2013.01); *H04W 74/0816* (2013.01)

(58) Field of Classification Search
 CPC ........... H04W 74/006; H04W 74/0808; H04W 74/0816; H04W 74/0833
 See application file for complete search history.

(56) References Cited

U.S. PATENT DOCUMENTS

2017/0290048 A1 10/2017 Amuru et al.
2018/0220288 A1* 8/2018 Agiwal ............... H04W 4/30
(Continued)

FOREIGN PATENT DOCUMENTS

CN 107889114 A 4/2018
CN 108476532 A 8/2018
(Continued)

OTHER PUBLICATIONS

The EESR of corresponding European application No. 19926714.7, dated Mar. 4, 2022.
(Continued)

*Primary Examiner* — Liton Miah
(74) *Attorney, Agent, or Firm* — Ladas & Parry LLP

(57) ABSTRACT

Provided are a method for transmitting information in a random access process, terminal device, and network device. The method includes: detecting, by a terminal device, a first RAR in a RAR window, the first RAR is used to schedule a first transmission resource, and the first transmission resource is configured to transmit a msg3; and determining, by the terminal device, whether to continue to detect a second RAR in the RAR window according to whether a preset condition is met, the second RAR is used to schedule a second transmission resource, and the second transmission resource is configured to transmit the msg3, the preset condition is that: the first transmission resource is within a target COT, and the target COT is a time range initiated by a network device for transmitting the first RAR; or is that: the terminal device successfully performs LBT on the first transmission resource.

10 Claims, 4 Drawing Sheets

(56) References Cited

U.S. PATENT DOCUMENTS

2020/0221402 A1* 7/2020 Zhang .................. H04W 72/23
2020/0245361 A1* 7/2020 Xiong ................. H04W 74/006
2021/0410186 A1* 12/2021 Hajir ................. H04W 72/0453

FOREIGN PATENT DOCUMENTS

| EP | 3541139 A1 | 9/2019 |
|---|---|---|
| WO | 2017026433 A1 | 2/2017 |
| WO | 2018088422 A1 | 5/2018 |

OTHER PUBLICATIONS

Ericsson:"Discussion additional opportunities for Msg3", 3GPP Draft; R2-1904738, vol. RAN WG2, No. Xi'an, China; Apr. 6, 2019(Apr. 6, 2019), XP051702017.
International Search Report (ISR) dated Jan. 23, 2020 for Application No. PCT/CN2019/084652.
Motorola Mobility, Lenovo:"Modifications to RACH procedure due to LBT" 3GPP TSG RAN WG2 Meeting 105bis R2-1904132 Apr. 12, 2019.
Mediatek Inc.: "Channel access procedure in NR-U" 3GPP TSG RAN WG1 Meeting #95 R1-1812356 Nov. 16, 2018.
Motorola Mobility, Lenovo:"Modifications to RACH procedure due to LBT" 3GPP TSG RAN WG2 Meeting 105 R2-1901211 Mar. 1, 2019.
Samsung: "Msg3 Transmission Handling in NR-U" 3GPP TSG-RAN2 105bis R2-1903100 Apr. 12, 2019.
Huawei, Hisilicon:"Initial access in NR unlicensed" 3GPP TSG RAN WG1 Meeting #96bis R1-1903929 Apr. 12, 2019.

* cited by examiner

METHOD FOR TRANSMITTING INFORMATION IN RANDOM ACCESS PROCESS, TERMINAL DEVICE AND NETWORK DEVICE

CROSS-REFERENCE TO RELATED APPLICATION

This application is a continuation of International Application No. PCT/CN2019/084652, filed on Apr. 26, 2019, the disclosure of which is hereby incorporated by reference in its entirety.

TECHNICAL FIELD

The present application relates to the field of communication, and more particularly, to a method for transmitting information in a random access process, terminal device and network device.

BACKGROUND

In the existing random access process, the terminal device will start a Random Access Response (RAR) window after sending a first message (msg1), and monitors an RAR during the RAR window. If the RAR is successfully received, the terminal device can stop monitoring the RAR and send a third message (msg3) using resources scheduled by the RAR obtained by monitoring.

In a New Radio (NR) in Unlicensed Spectrum (NR-U) system, however, the terminal device receives RAR transmission, and the uplink (UL) grant scheduled by the terminal device indicates a time-frequency resource for the msg3 transmission. The terminal device needs to perform Listen Before Talk (LBT) when sending the msg3. If the terminal device still stops monitoring the RAR after successfully monitoring the RAR according to the existing technology, when the terminal device fails to perform LBT, the terminal device cannot send msg3, and then the random access process fails.

SUMMARY

The embodiments of the present application provide a method for transmitting information in a random access process, terminal device, and network device, which can increase the transmission opportunity of msg3.

In a first aspect, there is provided a method for transmitting information in a random access process, including: detecting, by a terminal device, a first random access response RAR in an RAR window, where the first RAR is used to schedule a first transmission resource, and the first transmission resource is configured to transmit a third message msg3; and determining, by the terminal device, whether to continue to detect a second RAR in the RAR window according to whether a preset condition is met, where the second RAR is used to schedule a second transmission resource, and the second transmission resource is configured to transmit the msg3, where the preset condition is that: the first transmission resource is located within a target channel occupation time (COT), and the target COT is a time range initiated by a network device for transmitting the first RAR; or the preset condition is that: the terminal device successfully performs listen before talk LBT on the first transmission resource.

In a second aspect, there is provided a for transmitting information in a random access process, including: if a terminal device successfully performs listen before talk LBT, sending, by the terminal device, a first message and indication information to a network device through a target channel occupancy time COT obtained by the LBT, where the indication information is used to indicate whether the network device is able to send a second message to the terminal device through the target COT, and the second message is determined by the network device according to the first message.

In a third aspect, there is provided a method for transmitting information in a random access process, including: receiving, by a network device, the first message and indication information sent by a terminal device on a target channel occupation time COT, where the indication information is used to indicate whether the network device is able to use the target COT; determining, the network device, a second message according to the first message; and determining, by the network device, whether to send the second message to the terminal device through the target COT according to the indication information.

In a fourth aspect, there is provided a terminal device for performing the method according to the implementation forms of any one of the first aspect to the second aspect or to any one of the first aspect to the second aspect as such. Specifically, the terminal device includes a function module for performing the method according to the implementation forms of any one of the first aspect to the second aspect or to any one of the first aspect to the second aspect as such.

In a fifth aspect, there is provided a network device for performing the method according to the implementation forms of the third aspect or to the third aspect as such. Specifically, the terminal device includes a function module for performing the method according to the implementation forms of the third aspect or to the third aspect as such.

In a sixth aspect, there is provided a terminal device, including a processor and a memory. The memory is configured to store a computer program, and the processor is configured to call and run the computer program stored in the memory to perform the method according to the implementation forms of any one of the first aspect to the second aspect or to any one of the first aspect to the second aspect as such.

In a seventh aspect, there is provided a network device, including a processor and a memory. The memory is configured to store a computer program, and the processor is configured to call and run the computer program stored in the memory to perform the method according to the implementation forms of the third aspect or to the third aspect as such.

In an eighth aspect, there is provided a chip for implementing the method according to the implementation forms of any one of the first aspect to the third aspect or to any one of the first aspect to the third aspect as such. Specifically, the chip includes a processor, which is configured to call and run a computer program from a memory, so that a device installed with the chip performs the method according to the implementation forms of any one of the first aspect to the second aspect or to any one of the first aspect to the second aspect as such.

In a ninth aspect, there is provided a computer-readable storage medium for storing a computer program that enables the computer to perform the method according to the implementation forms of any one of the first aspect to the third aspect or to any one of the first aspect to the third aspect as such.

In a tenth aspect, there is provided a computer program product including a computer program instruction that enables the computer to perform the method according to the implementation forms of any one of the first, aspect to the third aspect or to any one of the first aspect to the third aspect as such.

In an eleventh aspect, there is provided a computer program, which, when run on a computer, enables the computer to perform the method according to the implementation forms of the first aspect to the second aspect or to the first aspect to the second aspect as such.

With the above technical solution, for the COT initiated by the network device, for example, the COT that can be used to send a msg2, the terminal device can determine whether the transmission of the msg3 is within the COT. If the transmission of msg3 is within the COT initiated by the network device, the terminal device can stop monitoring the RAR window after successfully detecting a RAR, which can reduce the overhead of blind detection of the RAR; if the transmission of msg3 is outside the COT initiated by the gNB it needs to continue to monitor RAR to increase the transmission opportunity of msg3.

DESCRIPTION OF EMBODIMENTS

The following will describe the technical solution of the embodiments of the present application with reference to the accompanying drawings of the embodiments of the present application. Obviously, the described embodiments are part of the embodiments of the present application, not all of them, Based on the embodiments of the present application, all other embodiments obtained by ordinary technicians in this field without creative labor belong to the scope of protection of the present application.

The technical solution of the embodiments of the present application can be applied to various communication systems, such as the global system of mobile communication (GSM), code division multiple access (CDMA) system, wideband code division multiple access (WCDMA) system, general packet radio service (GPRS), long term evolution (LTE) system, LTE frequency division duplex (FDD) system, LIE time division duplex (TDD), universal mobile telecommunication system (UMTS), worldwide interoperability for microwave access (WiMAX) communication system or 5G system.

Figure 1:
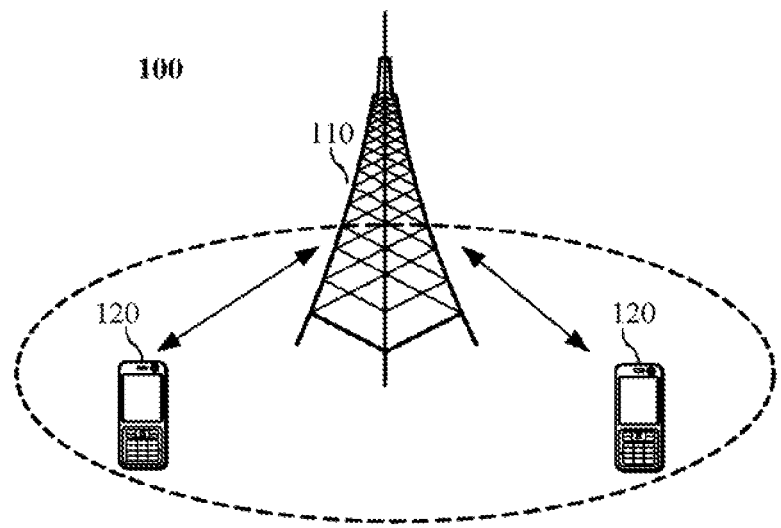
FIG. 1 is a schematic diagram of a communication system architecture provided by an embodiment of the present application.

Illustratively, communication system 100 applied in the embodiments of the present application is shown in FIG. 1. Communication system 100 can include network device 110, which can communicate with terminal device 120 (called a communication terminal or terminal), provides communication for a specific geographic area, and communicates terminal devices located in this area. In an embodiment, network device 110 can be a Base Transceiver Station (BTS) in a GSM or CDMA system, a Base Station (NodeB, NB) in a WCDMA system, an Evolutional NodeB (eNB or eNodeB) in a LTE system, or a wireless controller in a Cloud Radio Access Network (CRAN). Network device 110 can be the network device used in mobile switching centers, relay stations, access points, on-vehicle devices, wearable devices, hubs, switches, bridges, routers, 5G networks, or be the network device used in evolutional Public Land Mobile Network (PLMN) in the future.

Communication system 100 also includes at least one terminal device 120 located within the coverage range of network device 110. Terminal devices used here include but are not limited to devices that are connected through wired connections such as Public Switches Telephone Networks (PSTN), Digital Subscriber Line (DSL), digital cables, and direct cable connections; and/or another data connection/network; and/or via wireless interfaces, such as, cellular networks, Wireless Local Area Network (WLAN), digital television networks such as DVB-H networks, satellite networks, and AM-FM radio transmitters; and/or a device of another terminal device configured to receive/transmit communication signals; and/or Internet of Things (IOT) devices. A terminal device configured to communicate through a wireless interface may be referred to as a "wireless communication terminal", "wireless terminal", or "mobile terminal". Examples of mobile terminals include but are not limited to, satellite or cellular phones; Personal Communications System (PCS) terminals that combine cellular radiotelephony with data processing, facsimile, and data communication capabilities; PDA of radiophones, pagers, Internet/Intranet access, Web browsers, notebooks, calendars, and/or Global Positioning System, (GPS) receivers; and conventional lap and/or palmtop receivers or other electronic devices including radio-telephone transceivers. Terminal devices may refer to access terminal, User Equipment (UE), user unit, user station, mobile station, remote station, remote terminal, mobile equipment, user terminal, terminal, wireless communication equipment, user agent car user device. The access terminal may be a cellular phone, a cordless phone, a Session Initiation Protocol (SIP) phone, a Wireless Local Loop (WLL) station, a Personal Digital Assistant (PDA), handheld or compute devices with wireless communication capabilities, other processing devices connected to wireless modems, on-vehicle devices, wearable devices, terminals in 5G networks or terminal devices in evolutional PLMN in the future.

In an embodiment, direct Device to Device (D2D) communication can be conducted between terminal devices 120.

In an embodiment, 5G systems or 5G networks can also be referred to as New Radio (NR) systems or NR networks.

FIG. 1 illustrates an example of a network device and two terminal devices. In an embodiment, communication system 100 can include multiple network devices and the coverage of each of the network devices can include an additional number of terminal devices, which is not limited by this embodiment.

In an embodiment, the communication system 100 can also include other network entities such as network controllers, mobile management entities, which are not limited by this embodiment.

It should be understood that devices that have the communication functions in the network/system in the embodiments of the present application are referred to as communication devices. Taking communication system 100 shown in FIG. 1 as an example, network device 110 and terminal device 120 are communication devices. They both can be the specific devices mentioned above, which will not be described here. The communication devices also include other devices in communication system 100, such as network controllers, mobile management entities, and other network entities, which are not limited by the embodiment of the present application.

It should be understood that terms "system" and "network" used here are interchangeable, and term "and/or" indicates relationships between associated objects. For example, A and/or B can mean that only A is available, both A and B are available, and only B is available. In addition, character "/" used here generally indicates that the objects before and after "/" is in an "or" relationship.

A Random Access (RA) process is usually triggered by the following events.

1. Initial radio resource control (RRC) connection establishment, that is, when the UE changes from an idle state (IDLE) to a connected state, it will initiate random access;

2. RRC Connection Re-establishment procedure, that is, when the radio connection fails and the UE needs to re-establish an RRC connection, the UE will initiate random access;

3. Handover (HO), that is, when the UE performs handover, it will initiate random access in a target cell;

4. When the UE is in the RRC connected state (RRC_CONNECTED), upstream data or downstream data arrives; while when the UE is in a non-synchronised uplink state, the corresponding UE or base station initiates random access;

5. When the UE is in an RRC connected state (RRC_CONNECTED), the uplink data arrives, but there are no available uplink scheduling request (SR) resources on the Physical Uplink Control Channel (PUCCH);

6. SR transmission failed;

7. RRC reconfiguration request in synchronization;

8. Transition from an RRC connection inactive state (RRC_INACTIVE) to an RRC active state (active);

9. Time alignment is established in a serving cell (SCell);

10. Request for other system information (SI);

11. Random access triggered by Beam Failure Recovery (BFR).

According to different viper events, different random access modes can be used to perform the random access process. For example, in NR, two kinds of random access modes are mainly supported, which can be called competition-based random access mode and non-competition-based random access mode, and for each of the above trigger events, the competition-based random access mode can be selected; however, for some triggering events, such as the above event 3 or the above-mentioned event 4 of initiating random access process by the base station to transmit downlink data, the non-competition-based random access mode can also be used.

Figure 2:
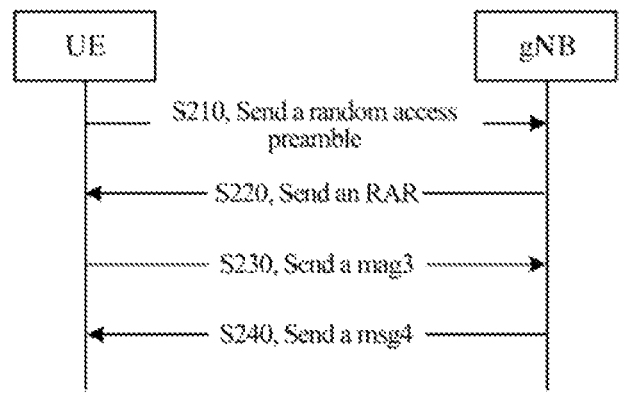
FIG. 2 is a schematic flowchart of a contention-based random access process provided by an embodiment of the present application.

The following describes the contention-based random access mode with reference to FIG. 2.

The competition-based random access process can also be referred to as a four-step contention random access process, as shown in FIG. 2, which mainly includes the following processes.

S210, send a random access preamble, that is, a terminal device sends a first message msg1. Specifically, in Step 1, the terminal device selects Physical Random Access Channel (PRACH) resources (including time-frequency resources and code field resources), and then sends the selected preamble on the selected PRACH time-frequency resources.

Correspondingly, the network device can estimate an uplink timing based on the preamble. For example, the network device can estimate a transmission delay between a network device and the terminal device, so that the network device station can calibrate the uplink timing and inform the terminal device of calibration information through a timing advance command.

In addition, the network device can also estimate, based on the preamble, a grant size required by the terminal device for transmitting the message in the third step, but the network device cannot accurately know it.

S220, send a Random Access Response (RAR), that is, in Step 2, the network device sends an RAR to the terminal device, that is, a second message msg2.

After the terminal device sends msg1, to RAR window will be started, and a Physical Downlink Control Channel (PDCCH) will be monitored in this window. The PDCCH is a PDCCH scrambled by a Random Access (RA) Radio Network Tempory Identity (RNTI).

In an embodiment, the RA-RNTI is related to the PRACH time-frequency resource selected by the terminal device. For example, the RA-RNTI can be calculated by the following formula:

$$RA\text{-}RNTI = 1s\_id + 14 \times t\_id + 14 \times 80 \times f\_id + 14 \times 80 \times 8 \times ul\_carrier\_id$$

where S_id represents an index of a first orthogonal frequency division multiplexing (OFDM) symbol occupied by PRACH; t_id represents an index of a first time slot occupied by PRACH in a system frame (for example, a range thereof is usually $0 \leq t\_id \leq 80$); where, a subcarrier interval used to determine t_id is determined based on a value of $\mu$; f_id represents an index of PRACH in a frequency field (for example, a range thereof is usually $0 \leq f\_id < 8$); ul_carrier_id represents an UL carrier used to transmit the preamble; for example, 1 represents supplementary uplink (SUL), and 0 represents non-supplementary uplink (NUL).

After the terminal device successfully monitors the PDCCH scrambled by RA-RNTI, it can obtain a physical downlink shared channel (PDSCH) scheduled by the PDCCH, and the RAR is included in this PDSCH.

The structure of the RAR will be described in detail below in conjunction with FIG. 3 to FIG. 6.

Figure 3:
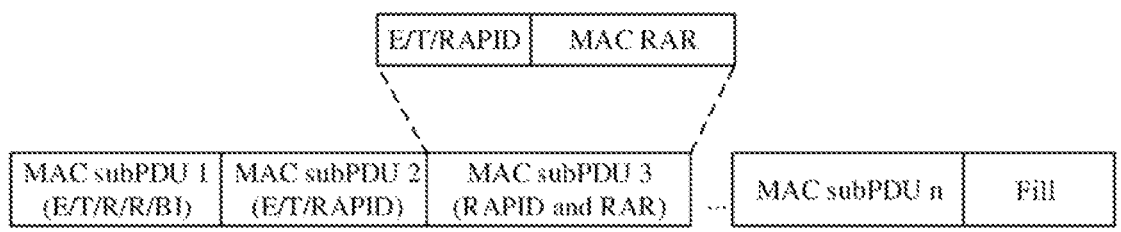
FIG. 3 is a schematic diagram of a MAC PDU provided by an embodiment of the present application.

FIG. 3 is a schematic diagram of a Media Access Control (MAC) Protocol Data Unit (PDU) provided by an embodiment of the present application. The MAC PDU includes at least one MAC RAR. Specifically, the MAC PDU includes a MAC subheader, a payload, and optional padding. For example, the MAC subheader may include a random access backoff indicator (BI) field and/or a random access preamble identity (RACH Preamble identity, RAPID) field. Payload can include one or more MAC RARs.

Figure 4:
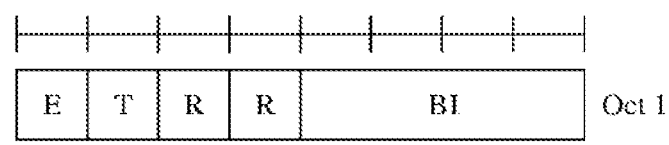
FIG. 4 is a schematic diagram of a MAC subheader provided by an embodiment of the present application.

Specifically, as shown in FIG. 3, the MAC PDL; may include 'n' MAC-subPDUs, where 'n' is a positive integer. The 'n' MAC-subPDUs may include one MAC-subPDU including only the random access BI field, for example, as shown in MAC-subPDU 1 in FIG. 3, where the BI field may be configured to indicate a backoff time for retransmission of the first message (msg1). The structure of the BI field may be as shown in FIG. 4, and the BI field in FIG. 4 occupies one byte (oct).

Figure 5:
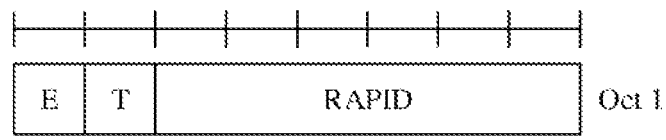
FIG. 5 is a schematic diagram of another MAC subheader provided by an embodiment of the present application.

In addition, the 'n' MAC-subPDUs may also include one MAC-subPDU including only a RAPID field, for example, as shown in MAC-subPDU 2 in FIC. 3, where the RAPID field is used for the network device to respond to a received preamble index. The structure of the RAPID field may be as shown in FIG. 5, and the RAPID field in FIG. 5 occupies one byte (oct).

As shown in FIG. 2 and FIG. 3, where E represents an Extension field, which can be used to indicate whether there is a MAC subbeader later. For example, 1 at E indicates that there is another subheader, and 0 at E indicates that there is no MAC subheader later.

As shown in FIG. 2 and FIG. 3, T represents a Type field, which can be used to indicate whether the MAC subheader is followed by BI or RAPID. For example, if T is 1, it indicates that RAPID is carried behind the current MAC subheader, and 0 indicates that BI is carried behind the current MAC subheader.

As shown in FIG. 2 and FIG. 3, R represents a Reserved bit, for example, it is always filled with 0.

As shown in FIG. 2 and FIG. 3, BI represents a backoff identifier. Generally, BI occupies 4 bits, ranging from 0 to 15, with high bits on the left and low bits on the right.

As shown in FIG. 2 and FIG. 3, RAPID represents a random access preamble index, which can be carried by msg1, occupies 6 bits, ranging from 0 to 63, with high bits on the left and low bits on the right.

As shown in FIG. 3, the 'n' MAC-subPDUs may also include one or more MAC RARs. For example, the MAC-subPDU3 in FIG. 3 includes a RAPID field and MAC RAR, where the RAPID field may be as shown in FIG. 5, which will not be repeated here; the MAC RAR can be as shown in FIG. 6.

Figure 6:
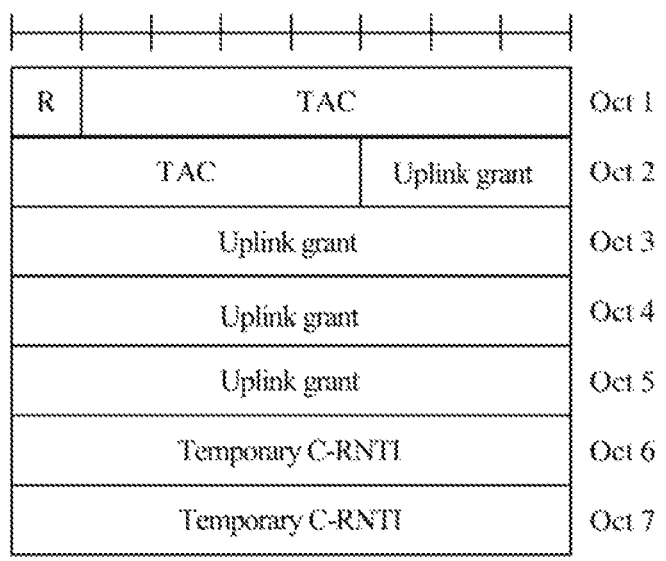
FIG. 6 is a schematic diagram of a MAC RAR provided by an embodiment of the present application.

Specifically, as shown in FIG. 6, the "R" included in the MAC RAR structure represents a Reserved bit, for example, it is always filled with 0. The "TAC" included in the MAC RAR structure represents Timing Advance Command (TAC), which usually occupies 12 bits and can be used to adjust the uplink timing, for example, a TA value used to inform the terminal device to perform uplink synchronization. The MAC RAR structure also includes an uplink grant (UL grant), which can be configured to schedule the uplink resource indication of the third information (msg3). The MAC RAR structure also includes a Temporary Cell-RNTI (C-RNTI), which can be used for subsequent transmission, for example, it can be used to scramble the PDCCH (initial access) of the fourth message (msg4).

S230, the terminal device sends a third message msg3; that is, in Step 3, the terminal device sends an RRC message to the network device on scheduling resources.

Because in the non-competition-based random access process, the preamble is dedicated to the terminal device, so there is no conflict; in addition, because the terminal device already has an unique identifier C-RNTI in the access cell, no network device is required to assign C-RNTI to it. Therefore, only the contention-based random access requires step 3 and step 4.

The reason why it is called msg3 instead of a specific message is that this message may be different according to different terminal device states and different application scenarios, so it is collectively called msg3, that is, the third message.

The msg3 is mainly configured to inform the network device of what event triggered the RA process. For example, if it is an initial access random process, the identity (ID) and establishment cause of the terminal device will be carried in the msg3. In case of RRC reestablishment, it will carry the identity of the terminal device in a connected state and the establishment cause.

Meanwhile, the ID carried by msg3 can make the competition conflict to be resolved in the fourth step. For example, the ID of the terminal device can be C-RNTI.

S240, the network device sends a fourth message msg4, that is, Step 4 is for Contention Resolution.

Msg4 has two functions, the first is used for the Contention Resolution, the second is to transmit an RRC configuration message to the terminal device. Whether to transmit RRC configuration message depends on the trigger condition of the random access process and a scheduling strategy of the network device, and has nothing to do with the conflict resolution itself.

There are two main ways to perform the Contention Resolution.

Method 1: if the terminal device carries C-RNTI in the third step, msg4 is scheduled by PDCCH scrambled by C-RNTI. Method 2: if the terminal device does not carry C-RNTI in step 3, such as it is in an initial access, msg4 is scheduled by PDCCH scrambled by TC-RNTI. The resolution of the conflict is to receive the PDSCH of msg4 through the terminal device and match the Common Control Channel (CCCH) Service Data Units (SDU) in the PDSCH.

In the prior art, the terminal device will start a RAR window after sending msg1, and monitors RAR during the RAR window. If the RAR is successfully received, the terminal device can stop monitoring the RAR and send msg3 using the resources scheduled by the RAR obtained by monitoring.

However, in NR-U system, the terminal device receives RAR transmission, and the UL grant scheduled by the terminal device indicates the time-frequency resources for msg3 transmission. The terminal device needs to perform LBT when sending the msg3. If LBT fails, the terminal device cannot send the msg3.

In this case, the terminal device may have two choices. One is to start the RA-contention resolution Tinier (RA-TIMER), and wait for the scheduling by the network device during the operation of the RA-TIMER to perform msg3 retransmission. However, the problem is that the network device does not detect any signal at the location where the msg3 is scheduled, and the network device cannot distinguish the following situations. Case 1, the terminal device does not receive RAR; case 2, the terminal device receives the RAR, but LBT fails when the terminal device sends the msg3. If it is the first case, the network device cannot reschedule, because even if the retransmission schedule is sent, since the terminal device does not have TC-RNTI (TC-RNTI is included in the RAR), the terminal device will still not receive it. If it is the second case, the network device can schedule retransmission; but if the network device does not schedule retransmission, the terminal device needs to wait until the RA-TIMER expires before it can choose to re-initiate msg1, which will cause a large time delay. The value of current maximum duration of this RA-TIMER can be configured as 64 ms.

Another choice is not to start RA-TIMER, and the terminal device will retransmit msg1 immediately; such a problem will cause the terminal device to frequently perform msg1 retransmission, resulting in overload of the system and interference to other terminal devices.

Therefore, the embodiment of the present application proposes a method for transmitting information in a random access process, which can reduce the situation that the terminal device cannot send the msg3 due to LBT failure when sending the msg3, and further avoid the above problems brought by this situation.

Figure 7:
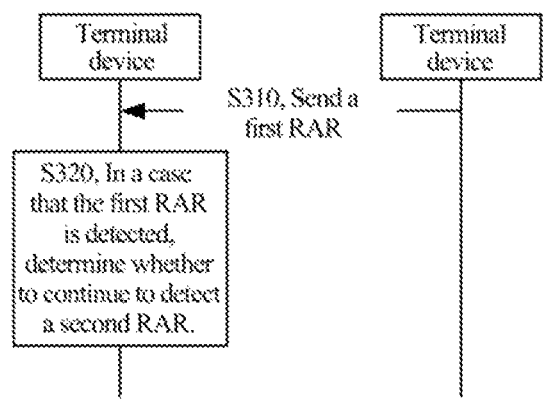
FIG. 7 is a schematic flowchart of a method for transmitting information a random access process provided by an embodiment of the present application.

FIG. 7 is a schematic flowchart of a method 300 for transmitting information in a random access process provided by an embodiment of the present application. The method 300 can be performed by a terminal device and a network device, for example, the terminal device and the network device may be as shown in FIG. 1.

As shown in FIG. 7, the method 300 includes: S310, send a first RAR, that is, the network device sends RAR to the terminal device. It should be understood that S310 may correspond to the process that the network device sends the RAR to the terminal device in the random access process, for example, S220 in the above method 200, which will not be repeated here for the sake of conciseness.

It should be understood that the network device sending RAR may include the network device sending at least one RAR to the terminal device.

As shown in FIG. 7, the method 300 includes: S320, if the first RAR is detected, determine whether to continue to detect a second RAR. Specifically, the terminal device detects the first RAR within an RAR window, where the first RAR is used to schedule a first transmission resource, and the first transmission resource is configured to transmit a third message msg3; thereafter, the terminal device determines whether to continue to detect the second RAR in the RAR window according to whether a preset condition is met, where the second RAR is used to schedule a second transmission resource, and the second transmission resource is configured to transmit the msg3. The preset condition is that the first transmission resource is located within a target COT, and the target COT is a time ramie initiated by the network device for transmitting the first RAR; or the preset condition is that the terminal device successfully performs LBT on the first transmission resource.

It should be understood that the successful detection of the first RAR in the embodiment of the present application includes that: the terminal device detects a PDCCH scrambled by RA-RNTI within the RAR window, where the PDCCH is configured to schedule at least one RAR; if a first subPDU existing in at least one subPDU corresponding to the at least one RAR meets that a random access preamble identity included in the first subPDU matches a preamble index of the terminal device, the terminal device determines that an RAR corresponding to the first subPDU is the first RAR.

That is to say, for r by one of one or more RAR detections by the terminal device, the successful detection of RAR by the terminal device indicates that the PDCCH scrambled by RA-RNTI is blindly detected in the RAR window, the PDCCH schedules RAR transmission, the RAR contains a subPDU, and the RAPID contained in the subPDU matches the preamble index of the terminal device.

The following will describe in detail how the terminal device determines whether to continue to detect the second RAR in combination with preset conditions.

In an embodiment, as a first embodiment, the preset condition is that the first transmission resource is located within the target channel occupation time COT. Specifically, after the terminal device sends a preamble, the RAR window is started in this window, if the terminal device successfully detects its own RAR, it determines whether to continue to monitor other RARs in the RAR window according to whether the msg3 resource scheduled by the RAR is located within the target COT initiated by the network device.

Specifically, in S320 of the method 300, the terminal device determines whether to continue to detect the second RAR in the RAR window according to whether the preset condition is met, including: if the first transmission resource is located within the target COT, that is, if the preset condition is met, the terminal device stops detecting the second RAR in the RAR window. In addition, the method 300 may further include: if the first transmission resource is located within the target COT, the terminal device sends the msg3 through the first transmission resource.

That is to say, if the msg3 transmission indicated by the UL grant in the RAR is located within the target COT initiated by the network device, the terminal device can stop the RAR Window; in other words, the terminal device no longer continues to detect the RAR, which can save the blind detection overhead to a certain extent and save electricity.

On the contrary, in S320 of method 300, the terminal device determines whether to continue to detect the second RAR in the RAR window according to whether the preset condition is met, further including: if the first transmission resource is located outside the target COT, that is, the preset condition is not met, the terminal device continues to detect the second RAR the RAR window. In addition, if the first transmission resource is located outside the target COT, the method 300 may further include: if the terminal device successfully performs LBT on the first transmission resource, the terminal device sends the msg3 through the first transmission resource; or if the terminal device fails to perform LBT on the first transmission resource and the terminal device successfully detects the second RAR, the terminal device performs LBT on the second transmission resource.

In other words, if the msg3 transmission indicated by the UL grant in the RAR is located outside the target COT initiated by the network device, the msg3 transmission is likely to fail due to the failure of LBT in this case, while the terminal device needs to continue to blindly detect the RAR in the RAR Window, that is, no matter whether LBT is successful or not before the msg3 transmission.

It should be understood that the terminal device can determine whether the first transmission resource is located within the target COT through indication information sent by the network device. Specifically, the method 300 further includes: the terminal device receives the indication information sent by the network device; the terminal device determines, according to the indication information, whether the first transmission resource is located within the target COT.

In an embodiment, the indication information may directly indicate whether the first transmission resource is located within the target COT. Alternatively, the indication information can be used to indicate a maximum time that the network device occupies the target COT, so that the terminal device can determine whether the first transmission resource is located within the target COT according to the maximum time. For example, if the maximum time occupied indicated by the indication information is at the same position of the end time of the channel occupied by the network device, the terminal device determines whether the first transmission resource is located within the target COT according to the end time when sending the msg3.

In an embodiment, the msg2 sent by the network device may include the indication information, for example, the indication information may be located within the first RAR; or the indication information is located within downlink control information, and the downlink control information is configured to schedule the first RAR. For example, the indication information is located within Downlink Control Information (DCI) of PDCCH scrambled by RA-RNTI, or the indication information can also be included in a PDCCH order.

In an embodiment, the method 300 may further include: the terminal device determines a channel access mode for sending the msg3, in other words, determines the category of LBT performed by resources that transmit msg3. Specifically, the terminal device may determine the channel access mode for sending the msg3 according to category indication information sent by the network device, where the category indication information may be the foregoing indication information used to indicate whether the first transmission resource is located within the target COT or the category indication information may be other indication information, which will not be repeated by the embodiments of the present application.

In the following description, a case that the category indication information is the foregoing indication information used to indicate whether the first transmission resource is located within the target COT is taken as an example. That is, the indication information can also be used to indicate the channel access mode for the terminal device to send the msg3, or it can be the category of LBT performed by the terminal device on the resources configured to send the msg3.

For ease of description, LBT category in the embodiments of the present application, is the channel access mode. Specifically, LBT mainly includes the following four categories (CAT).

CAT 1, LBT is not performed before data transmission.

CAT 2, LBT without random backoff LBT is performed before data transmission. If the channel is idle, data transmission will be performed in the subsequent channel occupation time; otherwise, data cannot be transmitted in the whole frame period. The length of time for the sender to determine whether the signal is idle before sending data is determined (for example, 16 μs).

CAT 3, LBT with a fixed competition window and random backoff. Before sending data, LBT is performed, that is, whether the signal is idle is determined before sending data, and the time length for determining whether the signal is idle is a random number N. The N is a value randomly selected by the sending end in the competition window, and maximum and minimum values of the N are a size of the competition window, and the size of the competition window is fixed.

CAT 4, LBT with a variable competition window and random backoff. Before sending data, LBT is performed, that is, whether the signal is idle is determined before sending data, and the time length for determining whether the signal is idle is a random number N. The N is a value randomly selected by the sending end in the competition window, and maximum and minimum values of the N are a size of the competition window, and the size of the competition window is variable.

Generally, if the transmission resource used by the terminal device to send the msg3 is located within the target COT, the terminal device can use the first two LBT categories, namely CAT 1 and CAT 2; if the transmission resource for sending the msg3 is located outside the target COT, the terminal device can use the latter two LBT categories, namely CAT 3 and CAT 4.

In an embodiment, the network device may instruct the terminal device to use any of LBT mechanisms mentioned above to send msg3 through the indication information, or the terminal device may determine by itself which LBT mechanism is used to send msg3.

For example, the indication information may indicate that the first transmission resource is located within the target COT, and the indication information also indicates that the channel access mode used by the terminal device when sending the msg3 is a first category of channel access mode or a second category of channel access mode, where the first category of channel access mode is the above CAT 1: the terminal device does not perform LBT and directly sends the msg3 the second category of channel access mode is the above CAT 2; the terminal device sends the msg3 according to an LBT result after performing LBT for a fixed listening duration.

For another example, in a case that the indication information indicates that the first transmission resource is located within the target COT, or that the terminal device determines that the first transmission resource is located within the target COT according to the maximum time that the network device occupies the target COT indicated in the indication information, the terminal device can also determine the channel access mode used when sending the msg3 according to the maximum time that the network device occupies the target COT. If a distance between ab end time when the network device occupies the target COT and a start time when the msg3 is sent is less than or equal to a first threshold, the terminal device determines that the channel access mode used when sending the msg3 is a first category of channel access mode, where the first category of channel access mode is CAT 1: the terminal device does not perform LBT and directly sends the msg3. If the distance between the end time when the network device occupies the target COT and the start time when the msg3 is sent is greater than the first threshold and less than or equal to a second threshold, the terminal device determines that the channel access mode used when sending the msg3 is a second category of channel access mode, where the second category of channel access mode is CAT 2; the terminal device sends the msg3 according to an LBT result after performing LBT for a fixed listening duration.

The first threshold and the second threshold can be set as required. For example, the first threshold may be set to 16 us, and the second threshold may be set to 25 us.

For another example, in a case that the indication information may indicate that the first transmission resource is located outside the target COT, or that the terminal device determines that the first transmission resource is located outside the target COT according to the maximum time that the network device occupies the target COT indicated in the indication information, the terminal device performs LBT on the first transmission resource through a fourth category of channel access mode, where the fourth category of channel access mode is the above CAT 4; the terminal device uses a variable-size listening duration to perform LBT on the first transmission resource. Alternatively, the terminal device can also use CAT 3 to perform LBT on the first transmission resource, which will not be limited by the embodiments of the present application.

In an embodiment, as a second embodiment, the preset condition is that the terminal device successfully performs LBT on the first transmission resource. At this time, in S320 of the method 300, the terminal device determines whether to continue to detect the second RAR in the RAR window according to whether the preset condition is met, including: if the terminal device fails to perform LBT on the first transmission resource, that is, the preset condition is not met, the terminal device continues to detect the second RAR in the RAR window.

In other words, regardless of whether the transmission resource of msg3 sent by the terminal device is located within or outside the target COT initiated by the terminal device, the terminal device determines whether it needs to stop the RAR window according to whether LBT is successfully performed on the resource that sends the msg3. If LBT for the msg3 transmission fails, the terminal device needs to continue to blindly detect the RAR based on the RAR window.

In an embodiment, if LBT the msg3 transmission is successful, the terminal device can stop the RAR window.

Similar to the first embodiment above, the terminal device can determine the category of LBT before performing LBT on the resource that sends the msg3, for example, before performing LBT on the first transmission resource. Specifically, the terminal device can determine the category of LBT by itself, or the network device can indicate the category of LBT performed by the terminal device.

For example, the method 300 may further include that the terminal device receives indication information sent by the network device; the terminal device determines the category of LBT performed on the first transmission resource according to the indication information.

For example, the indication information may indicate that the terminal device uses any category of LBT from CAT 1 to CAT 4.

For another example, the indication information indicates a maximum time that the network device occupies the target COT, and the terminal device determines the channel access mode used when sending the msg3 according to the maximum time. If a distance between an end time when the network device occupies the target COT and a start time when the msg3 is sent is less than or equal to a first threshold, the terminal device determines that the channel access mode used when sending the msg3 is a first category of channel access mode, where the first category of channel access mode is CAT 1: the terminal device does not perform LBT and directly sends the msg3. If the distance between the end time when the network device occupies the target COT and the start time when the msg3 is sent is greater than the first threshold and less than or equal to the second threshold, the terminal device determines that the channel access mode used when sending the msg3 is a second category of channel access mode, where the second category of channel access mode is CAT 2: the terminal device sends the msg3 according to an LBT result after performing LBT for a fixed listening duration.

The first threshold and the second threshold can be set as required. For example, the first threshold may be set to 16 us, and the second threshold may be set to 25 us.

In the embodiments of the present application, the terminal device starts an RA-contention Resolution Timer only when the msg3 is successfully sent, for example. Specifically, after the terminal device successfully sends msg3 by using the first embodiment or the second embodiment, the method 300 may further include: starting a random access contention resolution timer; the terminal device receives a fourth message msg4 sent by the network device according to the random access contention resolution timer.

For example, after LBT is successfully performed, the terminal device sends the msg3, and when the terminal device receives indication from a physical layer indicating that the msg3 has been successfully transmitted (or retransmitted) at an MAC layer, the terminal device will start the RA-contention Resolution Timer at the MAC layer.

Therefore, in the method for transmitting information in the random access process according to the embodiments of the present application, for the COT initiated by the network device, for example, the COT that can be used to send a msg2, the terminal device can determine whether the transmission of the msg3 is within the COT. If the transmission of msg3 is within the COT initiated by the network device, the terminal device can stop monitoring the RAR window after successfully detecting a RAR, which can reduce the overhead of blind detection of the RAR; if the transmission of msg3 is outside the COT initiated by the gNB, it needs to continue to monitor RAR to increase the transmission opportunity of msg3. Alternatively, the terminal device can also determine whether to continue RAR blind detection based on whether LBT performed on the transmission resource of msg3 is successful, which can also reduce the overhead of blind detection of the RAR and increase the transmission opportunity of msg3.

In view of the COT initiated by the network device, for example, the COT that can be configured to send msg2. The terminal device can determine whether the transmission of msg3 is within the COT. Similarly, COT initiated by terminal device can also be used by the network device. Therefore, the present application proposes another method for transmitting information in a random access process, which can improve resource utilization.

Figure 8:
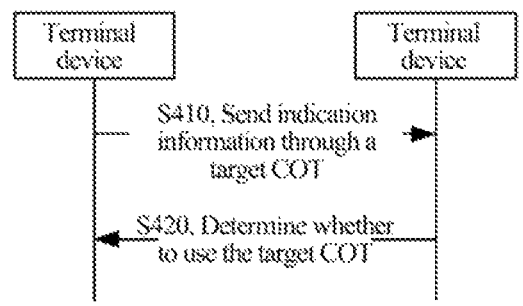
FIG. 8 is a schematic flowchart of another method for transmitting information in a random access process provided by an embodiment of the present application.

FIG. 8 is a schematic flowchart of another method 400 for transmitting information in a random access process provided by an embodiment of the present application. The method 400 can be performed by the terminal device and the network device as shown in FIG. 1, for example, the terminal device and network device may be as shown in FIG. 1.

As shown in FIG. 8, the method 400 includes: S410, send indication information through a target COT. Specifically, if the terminal device successfully performs LBT, the terminal device sends a first message and indication information to the network device through the target. COT obtained by the LBT, where the indication information is used to indicate whether the network device can send a second message to the terminal device through the target COT, and the second message is determined by the network device according to the first message.

S420, determine whether to use the target COT. Specifically, the network device receives the first message and the indication information sent by the terminal device on the target COT, where the indication information is used to indicate whether the network device can use the target COT, the network device determines a second message according to the first message; and the network device determines whether to send the second message to the terminal device through the target COT according to the indication information.

The method 400 will be described in detail below in conjunction with two specific scenarios.

Scenario 1, the method 400 can be used in a contention-based random access process, specifically, the first message in the method 400 is a third message msg3 in a random access process and the second message is a fourth message msg4 in the random access process.

Specifically, if LBT for the msg3 is successful and LBT for the msg3 is initiated by the terminal device, in other words, the msg3 does not share COT with a msg2, that is, the target COT is different from a COT where the msg2 in the random access process is located, the terminal device can send the msg3 in the target COT obtained through LBT, and can also send indication information to the network device at the same time. The indication information is used to indicate whether the network device can use the target COT of the msg3.

In an embodiment, the indication information can directly indicate whether the network device is able to use the target COT; or the indication information can also be used to indicate a total length of the target COT; or the indication information includes a length of the COT that the network device can use.

Correspondingly, in S420, the network device receives the indication information and determines whether to schedule transmission of msg4 in the COT according to the indication information, that is, whether to schedule transmission of msg4 in the target COT depends on the implementation of the network device.

In an embodiment, if the network device determines, according to the indication information, that the transmission of msg4 is within the target COT indicated in the msg3, then the network device can use the category of LBT of CAT 2 to send the msg4, or it can use CAT 1 to send the msg4 without LBT, but the embodiments of the present application are not limited thereto.

Scenario 2, the method 400 can also be used for a 2-step random access process. Specifically, the first message is a message A (msgA) of a 2-step random access process, that is, a message B (msgB) can be sent by using COT of the msgA.

For the 2-step random access process, the terminal device sending the msgA may include sending a preamble and/or sending a PUSCH.

It should be understood that the terminal device needs to perform LBT when sending the msgA and correspondingly, the method 400 further includes: the terminal device determines a category of LBT. The terminal device can determine the category of LBT in many ways.

For example, the terminal device determines the category of LBT according to the content of the PUSCH. Specifically, the terminal device can determine the category of LBT according to the lowest priority of data multiplexed in the MAC PDU included in the PUSCH.

For example, the network device configures a different channel access priority class for each logical channel of the terminal device. The terminal device multiplexes different MAC SDUs and/or MAC Control Elements (CEs) in an MAC PDU transmitted by the PUSCH. Different MAC SDUs come from different logical channels, and the channel access priority class of the PUSCH containing the MAC PDU is determined by a lowest access priority class among the channel access priority classes of the MAC SDU and/or MAC CE multiplexed therein. The channel access priority class of the MAC CE can be pre-specified, and the channel access priority class of the logical channel corresponding to the MAC SDUI can be pre-configured by the network device.

For another example, the terminal device may also determine the category of LBT performed in the target COT according to the event that triggers the random access process, that is, different trigger times correspond to different categories of LBT.

For example, for HO and BFR, LBT with a high priority can be used, but for other events. LBT with a low priority can be used, but the embodiments of the present application are not limited thereto.

In an embodiment, the category of LBT performed by the terminal device before sending the preamble and the category of LBT performed before sending the PUSCH may be set to be the same or different, and the embodiments of the present application are not limited thereto.

In an embodiment, if LBT used by the terminal device before sending the msgA is successful, the msgA can be sent in the target COT obtained by the LBT, and at the same time, the indication information can be sent in the msgA. The indication may include at least one of the following information: a length of the target COT; whether the network device is able to send the second message to the terminal device through the target COT; a length of time that the network device is able to occupy in the target COT; and whether the terminal device is able to continue to use the target COT after receiving the second message.

Therefore, in the method for transmitting information in the random access process according to the embodiments of the present application, when LBT initiated by the terminal device is successful, for the COT obtained by the LBT, while the terminal device transmits information to the network device through the COT, it can also indicate whether the network device can use the COT to send data to the terminal device, thereby improving the utilization rate of resources.

It should be understood that in various embodiments of the present application, the sequence number of the above processes does not indicate the order of execution, and the execution sequence of each process should be determined by its function and internal logic, and should not constitute any limitation onto the implementation process of the embodiments of the present application.

The method for transmitting information in random access process according to the embodiments of the present application is described in detail above with reference to FIG. 1 to FIG. 8, and the terminal device and network device according to the embodiments of the present application will be described below with reference to FIG. 9 to FIG. 13.

Figure 9:
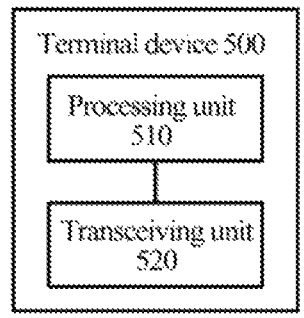
FIG. 9 is a schematic block diagram of a terminal device provided by an embodiment of the present application.

As shown in FIG. 9, a terminal device 500 according to an embodiment of the present application includes a processing unit 510 and a transceiving unit 520. In an embodiment, the terminal device 500 may be configured to perform the method 300 in the embodiment of the present application. Specifically, the processing unit 510 is configured to detect an RAR in an RAR window, where the first RAR is used to schedule a first transmission resource, and the first transmission resource is configured to transmit a msg3 and determine whether to continue to detect a second RAR in the RAR window according to whether a preset condition is met, where the second RAR is used to schedule a second transmission resource, and the second transmission resource is configured to transmit the msg3, where the preset condition is that: the first transmission resource is located within a COT, and the target COT is a time range initiated by a network device for transmitting the first RAR; or the preset condition is that: the processing unit 510 successfully performs LBT on the first transmission resource.

As an embodiment, the preset condition is that: the first transmission resource is located within the target channel occupation time COT; the processing unit 510 is configured to if the first transmission resource is located within the target COT, stop detecting the second RAR in the RAR window, or if the first transmission resource is located outside the target COT, continue to detect the second RAR in the RAR window.

As an embodiment, if the first transmission resource is located within the target COT, the transceiving unit 520 is configured to send the msg3 through the first transmission resource.

As an embodiment, if the first transmission resource is located outside the target COT, the transceiving unit 520 is configured to send the msg3 through the first transmission resource if the processing unit 510 successfully performs LBT on the first transmission resource, or perform LBT on the second transmission resource if the processing unit 510 fails to perform LBT on the first transmission resource and the processing unit 510 successfully detects the second RAR.

As an embodiment, the processing unit 510 is further configured to: perform LBT on the first transmission resource through a fourth category of channel access mode, where the access method of the fourth category of channel is that: the processing unit 510 uses a variable-size listening duration to perform LBT on the first transmission resource.

As an embodiment, the transceiving unit 520 is configured to receive indication information sent by the network device; the processing unit 510 is configured to determine whether the first transmission resource is located within the target COT according to the indication information.

As an embodiment, the first RAR includes the indication information; or the indication information is located in downlink control information, where the downlink control information is used to schedule the first RAR.

As an embodiment, the indication information indicates whether the first transmission resource is located within the target COT.

As an embodiment, the indication information further indicates a channel access mode used when the msg3 is sent.

As an embodiment, the indication information indicates that the first transmission resource is located within the target COT, and the channel access mode used when the msg3 is sent is a first-class channel access mode or a second category of channel access mode, the first category of channel access mode is that: the processing unit 510 does not perform LBT and directly sends the msg3, the second category of channel access mode is that: the processing unit 510 sends the msg3 according to an LBT result after performing LBT for a fixed listening duration.

As an embodiment, the indication information is used to indicate a maximum time that the network device occupies the target COT; the processing unit 510 is configured to determine whether the first transmission resource is located within the target COT according to the maximum time.

As an embodiment, the processing unit 510 is further configured to: determine a channel access mode used when the msg3 is sent according to the maximum time.

As an embodiment, the first transmission resource is located within the target COT, and the processing unit 510 is configured to if a distance between an end time when the network device occupies the target COT and a start time when the msg3 is sent is less than or equal to a first threshold, determine that the channel access mode used when the msg3 is sent is a first category of channel access mode, where the first category of channel access mode is that: the processing unit 510 does not perform LBT and directly sends the msg3; if the distance between the end time when the network device occupies the target COT and the start time when the msg3 is sent is greater than the first threshold and less than or equal to a second threshold, determine that the channel access mode used when the msg3 is sent is a second category of channel access mode, where the second category of channel access mode is that: the processing unit 510 sends the msg3 according to the LBT result after performing LBT for a fixed listening duration.

As an embodiment, the preset condition is that: the processing unit 510 successfully performs LBT on the first transmission resource, and the processing unit 510 is configured to continue to detect the second RAR within the RAR window if it is failed to perform LBT on the first transmission resource.

As an embodiment, the transceiving unit 520 is configured to receive indication information sent by the network device; the processing unit 510 is configured to determine a category of LBT performed on the first transmission resource according to the indication information.

As an embodiment, the processing unit 510 is configured to detect a PDCCH scrambled by an RA-RNTI in the RAR window, where the PDCCH is configured to schedule at least one RAR; if a first subPDU existing in at least one subPDU corresponding to the at least one RAR meets that a random access preamble identity included in the first subPDU matches a preamble index of the terminal device, determine that an RAR corresponding to the first subPDU is the first RAR.

As an embodiment, the processing unit 510 is configured to start a random access contention resolution timer when the msg3 is successfully sent; the transceiving unit 520 is configured to receive a fourth message msg4 sent by the network device according to the random access contention resolution timer.

In an embodiment, the terminal device 500 can also be configured to perform the above method 400. Specifically, the transceiving unit 520 is configured to if the processing unit 510 successfully performs LBT send a first message and indication information to a network device through a target COT obtained by LBT, where the indication information is used to indicate whether the network device is able to send a second message to the terminal device through the target COT, and the second message is determined by the network device according to the first message.

As an embodiment, the first message is a msg3 in a random access process, the second message is a msg4 in the random access process, and the target COT is different from a COT where a second message msg2 in the random access process is located.

As an embodiment, the indication information includes at least one of the following information: whether the network device being able send the msg4 to the terminal device through the target COT; a total length of the target COT; and a length of the COT that is able to be used by the network device in the target COT.

As an embodiment, the first message is a message msgA of a 2-step random access process and sending the msgA includes: sending a random access preamble and sending a physical uplink shared channel PUSCH.

As an embodiment, the indication information includes at least one of the following information: a length of the target COT; whether the network device is able to send the second message to the terminal device through the target COT; a length of time that the network device is able to occupy within the target COT; and whether the transceiving unit 520 is able to continue to use the target COT after receiving the second message.

As an embodiment, the processing unit 510 is further configured to determine a category of LBT.

As an embodiment, the transceiving unit 520 sending the first message includes sending the PUSCH; the processing unit 510 is configured to determine the category of LBT according to content of the PUSCH.

As an embodiment, the processing unit 510 is configured to determine the category of LBT according to a lowest priority of data multiplexed in an MAC PDU included in the PUSCH.

As an embodiment, the processing unit 510 is configured to determine the category of LBT according to an event that triggers a random access process.

As an embodiment, the category of LBT performed before a preamble is sent is different from the category of LBT performed before the PUSCH is sent.

It should be understood that the above and other operations and/or functions of each unit in the terminal device 500 according to the embodiments of the present application are to implement, respectively, the corresponding process of the terminal device in each method in FIG. 1 to FIG. 8, which will not be repeated herein for the sake of conciseness.

Therefore, for the terminal device of the embodiments of the present application, for the COT initiated by the network device, for example, the COT that can be used to send a msg2, the terminal device can determine whether the transmission of the msg3 is within the COT. If the transmission of msg3 is within the COT initiated by the network device, the terminal device can stop monitoring the RAR window after successfully detecting a RAR, which can reduce the overhead of blind detection of the RAR; if the transmission of msg3 is outside the COT initiated by the it needs to continue to monitor RAR to increase the transmission opportunity of msg3.

In addition, when LBT initiated by the terminal device is successful, for the COT obtained by the LBT, while the terminal device transmits information to the network device through the COT, it can also indicate whether the network device can use the COT to send data to the terminal device, thereby improving the utilization rate of resources.

Figure 10:
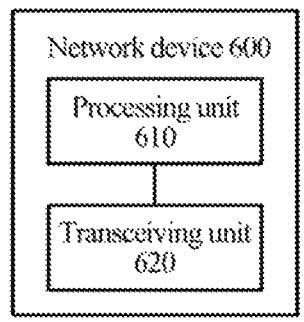
FIG. 10 is a schematic block diagram of a network device provided by an embodiment of the present application.

As shown in FIG. 10, a network device 600 according to an embodiment of the present application includes a processing unit 610 and a transceiving unit 620. Specifically, the transceiving unit 620 is configured to receive the first message and indication information sent by a terminal device on a COT, where the indication information is used to indicate whether the network device is able to use the target COT; the processing unit 610 is configured to determine a second message according to the first message and determine whether to send the second message to the terminal device through the target COT according to the indication information.

As an embodiment, the indication information is used to indicate that the network device is able to use the target COT, and the transceiving unit 620 is further configured to send the second message to the terminal device through the target COT according to the indication information.

As an embodiment, a channel access mode used when the second message is sent is a first-class channel access mode or a second-class channel access mode, the first category of channel access mode is that: the processing unit does not perform LBT and directly sends the second message, the second category of channel access mode is that: the processing unit 610 sends the second message according to an LBT result after performing LBT for a fixed listening duration.

As an embodiment, the first message is a msg3 in a random access process, the second message is a msg4 in the random access process, and the target COT is different from a COT where a second message msg2 in the random access process is located.

As an embodiment, the first message is a msgA of a 2-step random access process, and the first message received when the msgA is received includes: a received random access preamble and a received PUSCH.

It should be understood that the above and other operations and/or functions of each unit in the network device 600 according, to the embodiments of the present application are to implement, respectively, the corresponding process of the network device in each method in FIG. 1 to FIG. 8, which will not be repeated herein for the sake of conciseness.

Therefore, for the network device of the embodiments of the present application, in a case that LBT initiated by the terminal device is performed successfully, for the COT obtained by the LBT initiated by the terminal device, while receiving the information transmitted by the terminal device through the COT, the network device can also determine whether the COT can be used to send data to the terminal device according to the indication information, thereby improving the utilization rate of resources.

Figure 11:
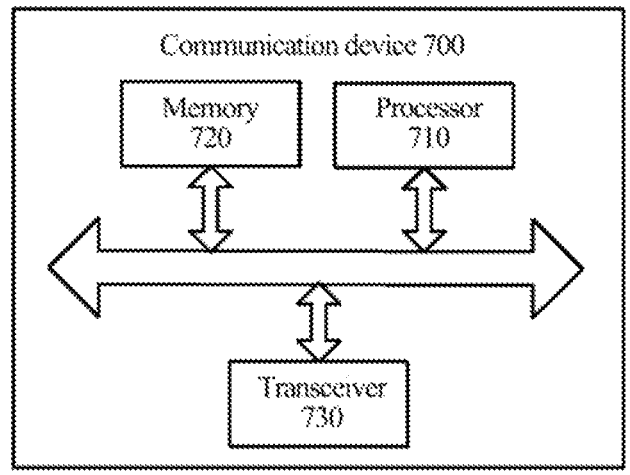
FIG. 11 is a schematic block diagram of a communication device provided by an embodiment of the present application.

FIG. 11 is a schematic structural diagram of a communication device 700 provided by an embodiment of the present application. The communication device 700 shown in FIG. 11 includes a processor 710, which can call and run a computer program from a memory to implement the method according to the embodiments of the present application.

In an embodiment, as shown in FIG. 11, the communication device 700 may further include a memory 720. The processor 710 may call and run the computer program from the memory 720 to implement the method according to the embodiments of the present application.

The memory 720 may be a separate device independent of the processor 710, or may be integrated in the processor 710.

In an embodiment, as shown in FIG. 1 the communication device 700 may further include a transceiver 730, and the processor 710 may control the transceiver 730 to communicate with other devices. Specifically, it may send information or data to other devices, or receive information or data sent by the other devices.

The transceiver 430 may include a transmitter and a receiver. The transceiver 430 may further include an antenna, and the number of antennas may be one or more.

In an embodiment, the communication device 700 may specifically be a network device in the embodiments of the present application, and the communication device 700 may implement the corresponding process implemented by the network device in each method of the embodiment of the present application, which will not be repeated herein for the sake of conciseness.

In an embodiment, the communication device 700 may specifically be a mobile terminal/terminal device of the embodiments of the application, and the communication device 700 may implement the corresponding processes implemented by the mobile terminal/terminal device in each method of the embodiments of the application, which will not be repeated herein for the sake of conciseness.

Figure 12:
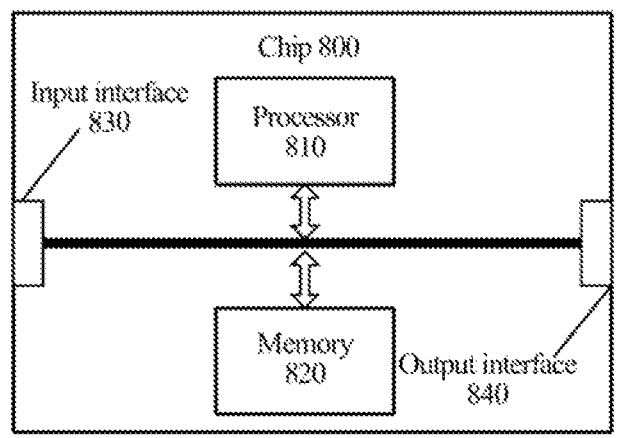
FIG. 12 is a schematic block diagram of a chip provided by an embodiment of the present application.

FIG. 12 is a schematic structural diagram of a chip provided by an embodiment of the present application. The chip 800 shown in FIG. 12 includes a processor 810, and the processor 810 can call and run a computer program from the memory to implement the method according to the embodiments of the present application.

In an embodiment, as shown in FIG. 12, the chip 800 may further include a memory 820. The processor 810 may call and run the computer program from the memory 820 to implement the method according to the embodiments of the present application.

The memory 820 may be a separate device independent of the processor 810, or may be integrated in the processor 810.

In an embodiment, the chip 800 may further include an input interface 830. The processor 810 can control the input interface 830 to communicate with other devices or chips, and specifically, can obtain information or data sent by other devices or chips.

In an embodiment, the chip 800 may further include an output interface 840. The processor 810 can control the output interface 840 to communicate with other devices or chips, and specifically, can output information or data to other devices or chips.

In an embodiment, the chip can be applied to the network device in the embodiments of the present application, and the chip can implement the corresponding process implemented by the network device in each method of the embodiments of the present application, which will not be repeated herein for the sake of conciseness.

In an embodiment, the chip can be applied to the mobile terminal/terminal device in the embodiments of the present application, and the chip can implement the corresponding process implemented by the mobile terminal/terminal device in each method of the embodiments of the present application, which will not be repeated herein for the sake of conciseness.

It should be understood that the chip mentioned in the embodiments of the present application may also be referred to as a system-level chip, a system chip, a chip system, a system-on-chip, etc.

Figure 13:
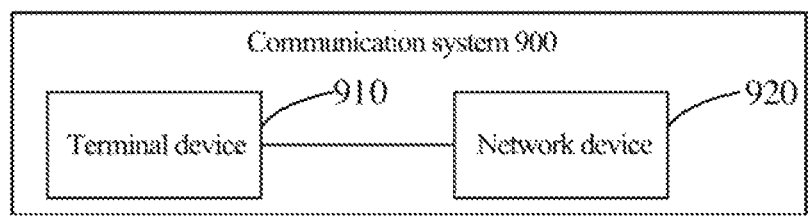
FIG. 13 is a schematic diagram of a communication system provided by an embodiment of the present application.

FIG. 13 is a schematic block diagram of a communication system 900 according to an embodiment of the present application. As shown in FIG. 13, the communication system 900 includes a terminal device 910 and a network device 920.

The terminal device 910 may be configured to implement the corresponding function implemented by the terminal device in the foregoing method, and the network device 920 may be configured to implement the corresponding function implemented by the network device in the foregoing method, which will not be repeated herein for the sake of conciseness.

It should be understood that the processor of the embodiments or the present application may be an integrated circuit chip with the signal processing capability. In the implementation process, the steps of the foregoing method embodiments can be completed by an integrated logic circuit of hardware in the processor or by instructions in the form of software. The above-mentioned processor can be a General Purpose Processor, a Digital Signal Processor (DSP), an Application Specific Integrated Circuit (ASIC), a Field Programmable Gate Array (FPGA) or other programming logic devices, discrete gates or transistor logic devices, discrete hardware components. The methods, steps, and logical block diagrams disclosed in the embodiments of the present application can be implemented or performed. The general purpose processor may be a microprocessor or the processor may also be any conventional processor or the like. The steps of the method disclosed in the embodiments of the present application can be directly embodied as being performed and completed by a hardware decoding processor, or performed and completed by a combination of hardware and software modules in the decoding processor. The software module can be located in a mature storage medium in the field such as a random access memory, a flash memory, read-only memory, a programmable read-only memory, or an electrically erasable programmable memory, a register. The storage medium is located in the memory, and the processor reads the information in the memory and completes the steps of the above method in combination with its hardware.

It can be understood that the memory in the embodiments of the present application may be a volatile memory or a non-volatile memory, or may include both the volatile memory and the non-volatile memory. The non-volatile memory can be a Read-Only Memory (ROM), a Programmable Read-Only Memory (Programmable RON, PROM), an Erasable PROM (EPROM), and an Electrically EPROM (EEPROM) or a flash memory. The volatile memory may be a Random Access Memory (RAM), which is used as an external high-speed cache. By way of example rather than limiting illustration, many forms of RAM are available, such as Static RAM (SRAM), a Dynamic RAM (DRAM), a Synchronous DRAM (SDRAM), a Double Data Rate SDRAM (DDR SDRAM), an Enhanced SDRAM (ESDRAM), a Synchronous DRAM (SLDRAM)) and a Direct Rambus RAM (DR RAM). It should be noted that the memories of the systems and methods described herein are intended to include, but are not limited to, these and any other suitable types of memories.

It should be understood that the above mentioned memory is exemplary but not restrictive, for example, the memory in the embodiments of the present application may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a Direct Rambus RAM (DR RAM), etc. That is, the memory in the embodiments of the present application is intended to include, but is not limited to, these and any other suitable types of memory.

The embodiments of the present application also provide a computer-readable storage medium for storing computer programs.

In an embodiment, the computer-readable storage medium can be applied to the network device in the embodiments of the present application, and the computer program enables a computer to perform the corresponding processes implemented by the network device in each method of the embodiments of the present application, which will not be repeated herein for the sake of conciseness.

In an embodiment, the computer-readable storage medium may be applied to the mobile terminal or terminal device in the embodiments of the present application, and the computer program enables a computer to perform the corresponding processes implemented by the mobile terminal/terminal device in each method in the embodiments of the present application, which will not be repeated herein for the sake of conciseness.

The embodiments of the present application also provide a computer program product, including computer program instructions.

In an embodiment, the computer program product can be applied to the network device in the embodiments of the present application, and the computer program instructions enable a computer to perform the corresponding processes implemented by the network device in each method of the embodiments of the present application, which will not be repeated herein for the sake of conciseness.

In an embodiment, the computer program product can be applied to the mobile terminal or terminal device in the embodiments of the present application, and the computer program instructions enable a computer to perform the corresponding processes implemented by the mobile terminal/terminal device in each method of the embodiments of the present application, which will not be repeated herein for the sake of conciseness.

The embodiments of the present application also provide a computer program.

In an embodiment, the computer program can be applied to the network device in the embodiment of the present application. When the computer program runs on the computer, it enables a computer to perform the corresponding processes implemented by the network device in each method of the embodiments of the present application, which will not be repeated herein for the sake of conciseness.

In an embodiment, the computer program can be applied to the mobile terminal or terminal device in the embodiments of the present application. When the computer program runs on the computer, it enables a computer to perform the corresponding processes implemented by the mobile terminal/terminal device in each method of the embodiments of the present application, which will not be repeated herein for the sake of conciseness.

Those of ordinary skill in the art will appreciate that the units and algorithm steps of the examples described in combination with the embodiments disclosed herein can be implemented by electronic hardware or a combination of computer software and electronic hardware. Whether these functions are performed by hardware or software depends on the specific application and design constraints of the technical solution. The professional technicians can use different methods for each specific application to implement the described functions, but such implementation should not be considered to be beyond the scope of the present application.

Those skilled in the art can clearly understand that, for convenience and concise of description, the specific working process of the above-described system, device, and unit can refer to the corresponding processes in the foregoing method embodiments, and will not be repeated herein.

In the several embodiments provided by the present application, it should be understood that the disclosed system, device, and method may be implemented in other ways. For example, the device embodiments described above are merely illustrative. For example, the division of the unit is only a logical function division, and there may be other divisions in actual implementation. For example, multiple units or components may be combined or be integrated into another system, or some features can be ignored or not implemented. In addition, coupling or direct coupling or communication connection shown or discussed herein may be an indirect coupling or communication connection through some interfaces, devices or units, and may be in electrical, mechanical or other forms.

The units described as separate components may or may not be physically separate. The components displayed as units may or may not be physical units, that is, they may be located in one place, or may be distributed to multiple network units. Some or all of the units may be selected according to actual needs to achieve the objectives of the solutions of the embodiments.

In addition, the functional units in the various embodiments of the present application may be integrated into one processing unit, or each unit may exist alone, physically, or two or more units may be integrated into one unit.

If the functions are implemented in the form of a software functional unit and sold or used as independent products, they can be stored in a computer readable storage medium. Based on this understanding, the technical solution of the present application, or the part contributing to the existing technology or the part of the technical solution can be embodied, in essence, in the form of a software product. The computer software product is stored in a storage medium and includes instructions for enabling a computer device (which may be a personal computer, a server, or a network device, etc.) to perform all or part of the steps of the methods described in the various embodiments of the present application. The aforementioned storage media includes various media that can store program code, such as a USB flash disk, a mobile hard disk, a Read-Only Memory (ROM), a Random Access Memory (RAM), a magnetic disk or an optical disk.

The above is only a specific implementation form of the present application, the scope of protection of the present application is not limited thereto, and changes or substitutions that can easily be thought of by those skilled in the art within the technical scope disclosed in the present application should be covered by the scope of protection of the present application. Therefore, the scope of protection of the present application should be subject to the scope of protection of the claims.

What is claimed is:

1. A method for transmitting information in a random access process, comprising:
    detecting, by a terminal device, a first random access response (RAR) in an RAR window, wherein the first RAR is used to schedule a first transmission resource, and the first transmission resource is configured to transmit a third message (msg3); and
    determining, by the terminal device, whether to continue to detect a second RAR in the RAR window according to whether a preset condition is met, wherein the second RAR is used to schedule a second transmission resource, and the second transmission resource is configured to transmit the msg3,
    wherein the preset condition is that: the first transmission resource is located within a target channel occupation time (COT), and the target COT is a time range initiated by a network device for transmitting the first RAR;
    wherein the determining, by the terminal device, whether to continue to detect a second RAR in the RAR window according to whether the preset condition is met, comprises:
        if the first transmission resource is located within the target COT, stopping, by the terminal device, detecting the second RAR in the RAR window, or
        if the first transmission resource is located outside the target COT, continuing, by the terminal device, to detect the second RAR in the RAR window
    wherein the method further comprises:
    receiving, by the terminal device, indication information sent by the network device; and
    determining, by the terminal device, whether the first transmission resource is located within the target COT according to the indication information;
    wherein the first RAR comprises the indication information; or
    the indication information is located in downlink control information, wherein the downlink control information is used to schedule the first RAR.

2. The method according to claim 1, wherein if the first transmission resource is located within the target COT, the method further comprises:

sending, by the terminal device, the msg3 through the first transmission resource.

3. The method according to claim 1, wherein if the first transmission resource is located outside the target COT, the method further comprises:
   if the terminal device successfully performs LBT on the first transmission resource, sending, by the terminal device, the msg3 through the first transmission resource; or
   if the terminal device fails to perform LBT on the first transmission resource and the terminal device successfully detects the second RAR, performing, by the terminal device, LBT on the second transmission resource;
wherein the method further comprises:
   performing, by the terminal device, LBT on the first transmission resource through a fourth category of channel access mode, wherein the fourth category of channel access mode is that: the terminal device uses a variable-size listening duration to perform LBT on the first transmission resource.

4. The method according to claim 1, wherein the indication information indicates whether the first transmission resource is located within the target COT;
   wherein the indication information further indicates a channel access mode used by the terminal device when sending the msg3;
   wherein the indication information indicates that the first transmission resource is located within the target COT, and the channel access mode used by the terminal device when sending the msg3 is a first category of channel access mode or a second category of channel access mode,
   the first category of channel access mode is that: the terminal device does not perform LBT and directly sends the msg3,
   the second category of channel access mode is that: the terminal device sends the msg3 according to an LBT result after performing LBT for a fixed listening duration.

5. The method according to claim 1, wherein the indication information is used to indicate a maximum time that the network device occupies the target COT:
   the determining, by the terminal device, whether the first transmission resource is located within the target COT according to the indication information, comprises:
   determining, by the terminal device, whether the first transmission resource is located within the target COT according to the maximum time;
wherein the method further comprises:
   determining, by the terminal device, a channel access mode used when sending the msg3 according to the maximum time;
wherein the first transmission resource is located within the target COT, the determining, by the terminal device, a channel access mode used when sending the msg3 according to the maximum time, comprises:
   if a distance between an end time when the network device occupies the target COT and a start time when the msg3 is sent is less than or equal to a first threshold, determining, by the terminal device, that the channel access mode used when sending the msg3 is a first category of channel access mode, wherein the first category of channel access mode is that: the terminal device does not perform LBT and directly sends the msg3;
   if the distance between the end time when the network device occupies the target COT and the start time when the msg3 is sent is greater than the first threshold and less than or equal to a second threshold, determining, by the terminal device, that the channel access mode used when sending the msg3 is a second category of channel access mode, wherein the second category of channel access mode is that: the terminal device sends the msg3 according to an LBT result after performing LBT for a fixed listening duration.

6. A terminal device, comprising:
   a processor and a transceiver,
   wherein,
   the processor is configured to detect a first random access response (RAR) in an RAR window, wherein the first RAR is used to schedule a first transmission resource, and the first transmission resource is configured to transmit a third message (msg3); and
   the processor is further configured to determine whether to continue to detect a second RAR in the RAR window according to whether a preset condition is met,
wherein the second RAR is used to schedule a second transmission resource, and the second transmission resource is configured to transmit the msg3,
   wherein the preset condition is that: the first transmission resource is located within a target channel occupation time (COT), and the target COT is a time range initiated by a network device for transmitting the first RAR;
   wherein in determining whether to continue to detect a second RAR in the RAR window according to whether the preset condition is met, the processor is configured to:
   if the first transmission resource is located within the target COT, stop detecting the second RAR in the RAR window, or
   if the first transmission resource is located outside the target COT, continue to detect the second RAR in the RAR window;
   wherein the transceiver is configured to receive indication information sent by the network device; and
   wherein the processor is further configured to determine whether the first transmission resource is located within the target COT according to the indication information;
   wherein the first RAR comprises the indication information; or
   the indication information is located in downlink control information, wherein the downlink control information is used to schedule the first RAR.

7. The terminal device according to claim 6, wherein if the first transmission resource is located within the target COT, the transceiver is further configured to:
   send the msg3 through the first transmission resource.

8. The terminal device according to claim 6, wherein if the first transmission resource is located outside the target COT, and
   if the terminal device successfully performs LBT on the first transmission resource, the transceiver is further configured to send the msg3 through the first transmission resource; or
   if the terminal device fails to perform LBT on the first transmission resource and the terminal device successfully detects the second RAR, the processor is configured to perform LBT on the second transmission resource;
wherein the processor is further configured to:
   perform LBT on the first transmission resource through a fourth category of channel access mode, wherein the fourth category of channel access mode is that: the terminal device uses a variable-size listening duration to perform LBT on the first transmission resource.

9. The terminal device according to claim 6, wherein the indication information indicates whether the first transmission resource is located within the target COT;
wherein the indication information further indicates a channel access mode used by the terminal device when sending the msg3;
wherein the indication information indicates that the first transmission resource is located within the target COT, and the channel access mode used by the terminal device when sending the msg3 is a first category of channel access mode or a second category of channel access mode,
the first category of channel access mode is that: the terminal device does not perform LBT and directly sends the msg3,
the second category of channel access mode is that: the terminal device sends the msg3 according to an LBT result after performing LBT for a fixed listening duration.

10. The terminal device according to claim 6, wherein the indication information is used to indicate a maximum time that the network device occupies the target COT;
wherein in determining whether the first transmission resource is located within the target COT according to the indication information, the processor is configured to:
determine whether the first transmission resource is located within the target COT according to the maximum time; and
determine a channel access mode used when sending the msg3 according to the maximum time;
wherein the first transmission resource is located within the target COT, and in determining a channel access mode used when sending the msg3 according to the maximum time, the processor is configured to:
if a distance between an end time when the network device occupies the target COT and a start time when the msg3 is sent is less than or equal to a first threshold, determine that the channel access mode used when sending the msg3 is a first category of channel access mode, wherein the first category of channel access mode is that: the terminal device does not perform LBT and directly sends the msg3;
if the distance between the end time when the network device occupies the target COT and the start time when the msg3 is sent is greater than the first threshold and less than or equal to a second threshold, determine that the channel access mode used when sending the msg3 is a second category of channel access mode, wherein the second category of channel access mode is that: the terminal device sends the msg3 according to an LBT result after performing LBT for a fixed listening duration.

* * * * *